United States Patent Office 3,367,138
Patented Feb. 6, 1968

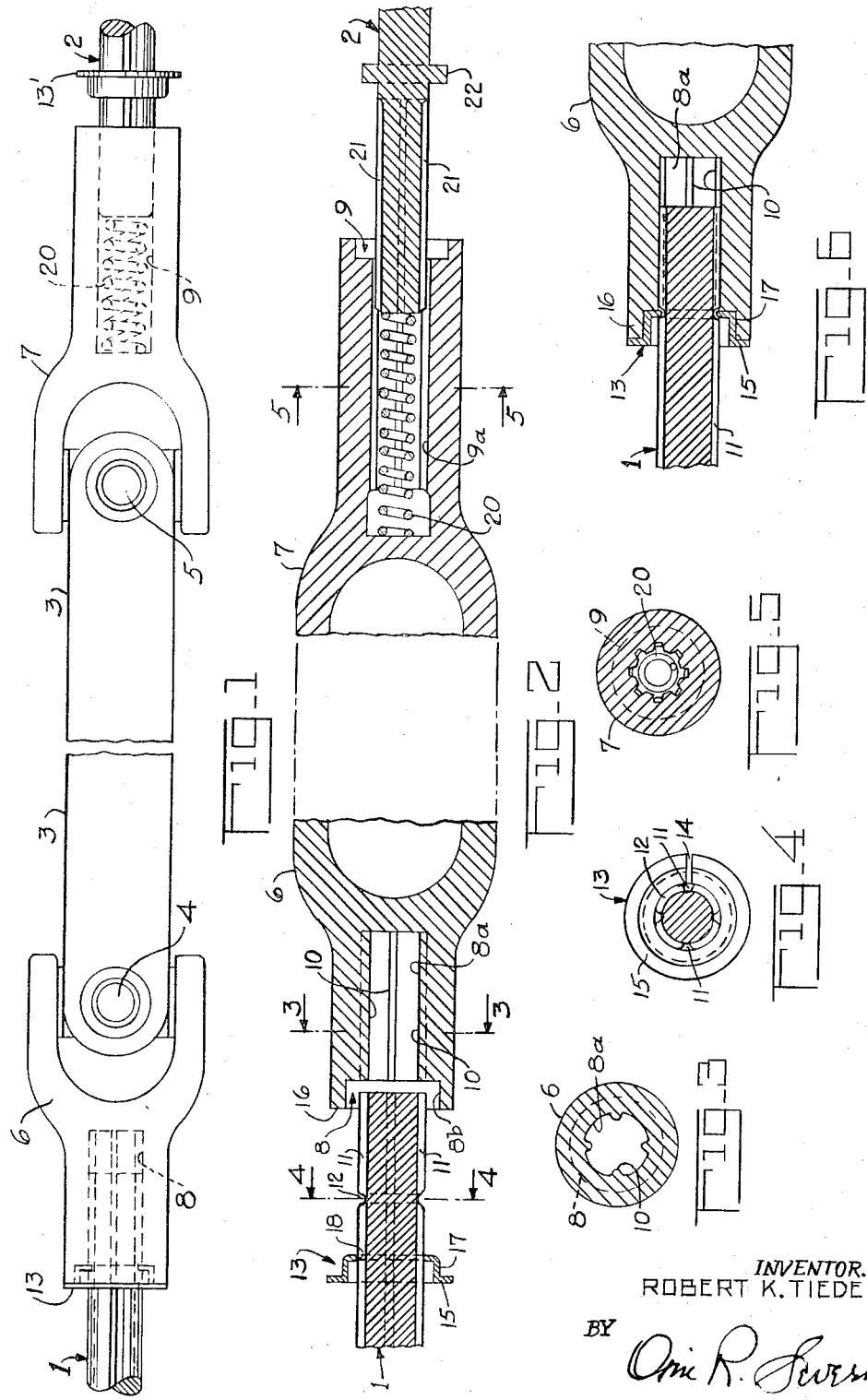

3,367,138
DETACHABLE SHAFT COUPLING
Robert K. Tiedeman, Wayne, N.J., assignor to Curtiss-Wright Corporation, a corporation of Delaware
Filed July 21, 1966, Ser. No. 566,818
10 Claims. (Cl. 64—1)

This invention relates to shaft couplings of the type providing for quick connection and disconnection of the drive and driven shafts incident to maintenance, replacement of associated parts, etc., and has for its principal object an improved detachable shaft coupling for a rotary drive that is easily connected to and disconnected from the associated shafts, respectively, that has positive shaft retention in the coupled position thereof, is simple and inexpensive in construction and that can be readily inspected when assembled for ensuring that the drive connection between the interconnected rotary shafts is properly assembled for positive and reliable drive.

Couplings of this character are especially useful where the drive and driven shafts are spaced a material distance and/or misaligned so as to require a universal-type drive connection between the shafts. In prior commercial equipment of this character, the coupling is in general not only comparatively involved and expensive, but also requires material time for connecting and disconnecting the individual shafts of the drive.

The invention will be more fully set forth in the following description referring to the accompanying drawings, and the features of novelty will be pointed out with particularity in the claims annexed to and forming a part of this specification.

Referring to the drawings:

FIG. 1 is a general view of an actuator shaft coupling embodying the present invention between a drive shaft and a driven shaft;

FIG. 2 is an enlarged partially exploded view of coupling structure shown in FIG. 1;

FIG. 3 is a cross-sectional view taken along the line 3—3 of FIG. 2;

FIG. 4 is a cross-sectional view taken along the line 4—4 of FIG. 2;

FIG. 5 is a sectional view taken along the line 5—5 of FIG. 2; and

FIG. 6 is a view, partly in section, showing the coupling at one shaft in the connected, assembled position.

Referring to FIG. 1, a drive shaft 1 and a driven shaft 2 suitably mounted in bearings (not shown) for rotary drive are interconnected by an intermediate actuator link 3 having universal joints at 4 and 5 for shaft couplers 6 and 7, respectively. The shafts are spaced and positioned according to drive requirements and are restrained by their associated bearings, etc., as to longitudinal movement. In a practical application, the invention is useful in a flaps actuator drive for aircraft.

The actuator drive and coupling structure between the shafts 1 and 2 include the couplers 6 and 7, respectively, which receive the shaft ends within recesses 8 and 9 that are formed in part as bore openings 8a and 9a corresponding to the shaft diameter. The recess of the coupler 6, for example, has stepped diameters, namely, that of the bore 8a and that of a larger co-extensive outer bore 8b. The coupler 6 is resiliently biased, as presently described, toward the shaft 1 so that the bore 8a receives the end of the shaft, and the coupler abuts retainer means 13 that is mounted on the shaft 1. The recess 8 is in alignment with the longitudinal axis of the shaft. From the description above, it will be seen that limited retracting movement of a coupler 6 is effective for disconnecting it from the associated shaft.

Referring specifically to the partly exploded view in FIG. 2, the coupler bore 8a has formed around its wall a plurality of parallel, longitudinal ridges or ribs 10 for meshing closely within corresponding flutes or grooves 11 formed in the shaft 1 along a part of the drive end. This interlocking of parts prevents relative rotation while allowing longitudinal or telescopic movement within limits.

The shaft 1 also has retention or restraining means such as an annular groove 12 for receiving a ring 13 that retains the coupling in the assembled drive position thereof. In particular, the retainer ring 13 is composed of resilient material as spring steel, and is radially split at 14 for providing tight clamping action on the shaft 1 and positive retention within the groove 12. The peripheral part 15 of the ring is flange-like, similar to the outer part of a disc, and the central part is offset from the plane of the flange to form a cup-like portion 17 that extends toward the recess 8. A central opening 18 in the cup portion 17 is of slightly smaller diameter than that of the cross section of shaft 1 at the groove 12 for providing the clamping and restraining function referred to above when the ring is snapped into the shaft groove.

Before describing the assembled view of the coupler 6, FIG. 2, reference will be made to the companion coupler 7, which includes a spring 20 that is positioned within an elongated recess 9 and interposed between the shaft 2 and the coupler 7. The spring is tensioned in the assembled position of the drive coupling so as to urge the actuator link 3 and coupler 6 toward the left as viewed in FIG. 1, i.e., toward the shaft 1.

Preliminary to assembling the apparatus, the retainer ring 13 is first spread at the split section 14 so that the ring can be forced along the shaft and beyond the groove 12 toward the left. The coupler 6 is manipulated by moving the actuator link against the spring 20 and rotating the coupler at the universal joint 4, FIG. 1, so as to bring the end of shaft 1 into alignment with the recess 8. The retainer ring 13 is then moved toward the right, FIG. 2, until it snaps into the groove 12, whereupon the spring pressure at 20 can be released so that the coupler 6 receives the shaft within the bore 8a and the central cup portion 17 of the retainer ring seats within the outer recess bore 8b. The peripheral flange 15 of the ring and the end annular extension or shoulder 16 of the coupler 6 are in abutting relation so that the coupling is in drive relation to the shaft. The outer flange 15 of the ring and the shoulder 16 of the abutting coupling are substantially flush so that the relative position of the assembled parts is obvious upon inspection, FIG. 6.

For simplicity, the coupling at the driven shaft 2 can essentially duplicate that described for shaft 1, a material difference being in the biasing spring 20 that is seated at one end on the shaft 2 and at the other end on the coupler 7 within the extended recess bore 9a. The retainer ring 13', FIG. 1, in this instance, functions as a stop-shoulder on the shaft 2 for limiting travel of the coupler 7 toward the right. This ensures against accidental disconnection in case of spring failure, for example, and possible disengagement of the shaft 1 and coupler 6 during operation of the drive. Alternatively, the shaft 2 and coupler 7 can be locked against relative rotation by conventional splines 21, FIG. 2, and the shaft 2 provided with a fixed shoulder or collar 22 serving as the limit stop for coupler 7.

Disconnection of the coupling in either arrangement is accomplished simply by moving the actuator link 3 and the coupler 6 a limited distance toward the right against the pressure of spring 20 for uncovering the retainer ring at coupler 6, and then "springing" the ring for moving it out of the groove 12 and along the shaft a short distance toward the left. This operation relaxes the spring 20 as the coupler 6 moves further toward the left, as determined by the length of the bore 8a; the actuator link 3 and coupler 7 also move therewith toward the left so that the coupler 7 can be readily disconnected from the shaft 2.

As described above, re-assembly is quickly and simply accomplished by first fitting the coupler 7 onto the shaft 2, after which the actuator link and coupler 7 are moved further toward the right to compress the spring 20 through a distance that allows the coupler 6 to move into position wherein the recess 8a is in alignment with and receives shaft 1. The retainer ring 13 has in the meantime been moved again toward the right, i.e., toward the groove 12 where it snaps into its retaining position. The operator now releases pressure on the spring 20 so that it forces the coupler 6 against the ring so that the central cup portion 17 is within the recess bore 8b and the shoulder 16 against the ring flange 15. The actuator link 3 and associated couplers are now in positive and secure drive position with respect to the shafts 1 and 2. During assembly, i.e., connection, the splined or equivalent interlocking arrangement allows considerable relative longitudinal (or telescopic) movement between a coupler and shaft without disconnecting the rotary drive connection.

A practical consideration of importance is that the peripheral shoulder 16 of the coupler 6, for example, when abutting the retainer ring flange 15, is itself a positive indication that the retainer is seated and locked in place. This feature provides for easy inspection for ensuring that the parts are assembled correctly for the intended drive function.

It should be understood that this invention is not limited to specific details of construction and arrangement thereof herein illustrated, and that changes and modifications may occur to one skilled in the art without departing from the spirit of the invention.

What is claimed is:

1. Coupling means for establishing a readily disconnected rotary drive between two shafts comprising
  (a) a member having a recess for receiving the coacting end of a first shaft,
  (b) means for interlocking said member and shaft within said recess against relative rotation, said member being movable along the longitudinal axis of the shaft,
  (c) means operatively connecting said member with the other shaft for rotation therewith and also for movement along its longitudinal axis,
  (d) a disc-like retainer ring for seating snugly on said first shaft near its end,
  (e) resilient means interposed between said member and the coacting end of said other shaft for urging said member onto said first shaft at said recess and into abutting engagement with the retainer ring,
  (f) and means formed on said first shaft for restraining both said retainer ring and member at a predetermined position thereon against the bias of said resilient means for defining the assembled position of the coupling.

2. Coupling means as specified in claim 1 wherein the retainer ring has a centrally offset portion extending into said recess, and the peripheral area of the ring is engaged by an annular peripheral extension of said member.

3. Coupling means as specified in claim 2 wherein said member is slidably connected in drive relation to the associated shaft through interengaging means on the recess wall and shaft, respectively, and the annular peripheral extension of the member forms a shoulder that is resiliently biased against a peripheral flange on the retainer ring, and the centrally offset portion of the ring fits within an outer enlarged part of the recess.

4. Coupling means as specified in claim 1 wherein said recess is of stepped diameter, one diameter corresponding to that of the first shaft for defining an inner bore, another and larger diameter defining a coextensive outer bore for receiving a portion of the retainer ring.

5. Coupling means as specified in claim 4 wherein the retainer ring has an offset cup-like portion fitting within said outer bore and the peripheral portion of the ring is an annular flange continuous with said cup-like portion, said flange being engaged by and restraining the end wall of the member at the outer bore.

6. Coupling means as specified in claim 1 wherein the retainer ring is split axially at one section for resiliently gripping said first shaft.

7. Coupling means as specified in claim 6 wherein the restraining means on the first shaft is an annular groove in which the split retainer ring is held by its contracting force against bias of the resilient means acting on said member.

8. Coupling means as specified in claim 1 wherein the recessed member is a coupler operatively connected through a second coupler with the other shaft, and an intermediate actuator link interconnects said couplers, at least one of said couplers being connected to the corresponding end of said link through a universal joint.

9. Coupling means as specified in claim 8 wherein the second coupler also has a recess for receiving the second shaft in drive relation, and a tensioned spring is seated in said recess between the end of said second shaft and the second coupler for applying thrust through the actuator link and biasing the first coupler into engagement with the retainer ring.

10. Coupling means as specified in claim 9 wherein the second coupler is splined to the second shaft and a shoulder forming a limit stop is located on the second shaft for limiting coupler movement in the direction that would cause disconnection of the first coupler and its shaft.

References Cited
UNITED STATES PATENTS

| | | | |
|---|---|---|---|
| 2,468,182 | 4/1949 | Dempsey | 64—1 |
| 2,556,380 | 6/1951 | Stillwagon | 64—1 |
| 2,567,127 | 9/1951 | Shoffner | 64—1 |
| 2,598,780 | 6/1952 | Garnier | 64—1 |

HALL C. COE, *Primary Examiner.*